July 25, 1961   H. N. SCHLEIN   2,993,368
DEVICE FOR TESTING MATERIAL
Filed June 28, 1960

INVENTOR
*Herbert N. Schlein*

BY

ATTORNEY

United States Patent Office 2,993,368
Patented July 25, 1961

2,993,368
DEVICE FOR TESTING MATERIAL
Herbert N. Schlein, Framingham, Mass., assignor to the United States of America as represented by the Secretary of the Army
Filed June 28, 1960, Ser. No. 39,416
7 Claims. (Cl. 73—102)
(Granted under Title 35, U.S. Code (1952), sec. 266)

The invention described herein, if patented, may be manufactured and used by or for the Government for governmental purposes, without the payment to me of any royalty thereon.

The present invention relates to testing apparatus and more particularly to apparatus for testing the resistance of impermeable or semi-impermeable sheet materials to stress.

While apparatus for testing the bursting strength of sheet or filamentary material is available, the resistance of sheet material to bursting is not a very accurate indication of its toughness or resistance to the stress and wear incident to the use thereof as a barrier or wrapping material. The apparatus of the present invention is designed particularly to subject sheet materials to stresses simulating the stresses to which barrier or wrapping materials are subjected when used to wrap packages of various shapes and particularly packages having sharp edges or corners.

Accordingly, an object of the invention is to provide a new and improved testing apparatus for testing the resistance of impermeable or semi-permeable sheet materials to polyaxial stresses akin to the stresses causing tearing or puncturing of the material.

Another object of the invention is to provide a new and improved apparatus for making comparative tests of the toughness or durability of different kinds of impermeable or semi-permeable sheet materials to determine the relative suitability thereof for use as barrier or wrapping materials.

A further object of the invention is to provide a new and improved apparatus for testing impermeable or semi-permeable sheet materials to determine the maximum vacuum such materials can withstand, the resistance of these materials to slow leakage of air over a relatively extended period of time, and whether or not particular materials can withstand vacuum of a predetermined value.

A more general object of the invention is to provide a new and improved testing apparatus as specified in the preceding objects which is extremely simple in construction with a minimum number of parts so that it is inexpensive to construct and maintain and which is simple and reliable in operation.

These and other objects, advantages and capabilities of the invention will become apparent from the following specification and the accompanying drawing wherein.

Figure 1:
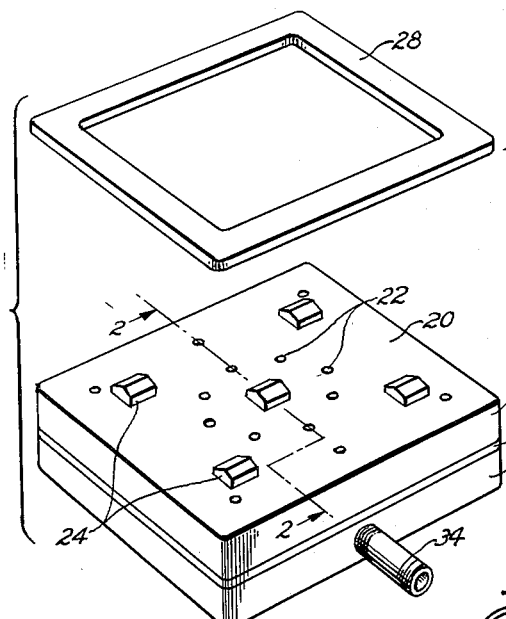
FIG. 1 is an exploded perspective view of the improved sheet material holding and stressing apparatus of the present invention.

In the drawings, where a preferred embodiment of the invention is shown, for the purposes of illustration only, like parts are indicated by the same numbers in the several views. Referring to FIG. 1, the improved apparatus of the present invention includes a box-like casing indicated in its entirety by the number 10, which is of relatively low height and is shown as being square in peripheral outline. It may, of course, be of any rectilineal or other shape. Preferably the casing is made of aluminum, but any other rigid inexpensive, lightweight material may be used for this purpose. The casing 10 is hollow and comprises a bottom section 12 and a complementary upper or top section 14, which may be releasably secured to the bottom section by means of a plurality of screws, two of which are shown at 16 in FIG. 2. A gasket 18 of rubber, polyethylene, or any other suitable material is interposed between the two sections so that a fluid-tight seal may be obtained between these parts by the proper degree of tightening of screws 16. The top wall of the upper casing section 14 has a relatively flat outwardly facing topside 20 and a series of perforations 22 extending therethrough for establishing communication between the interior of the casing and the topside 20 for a purpose to be described.

Figure 2:
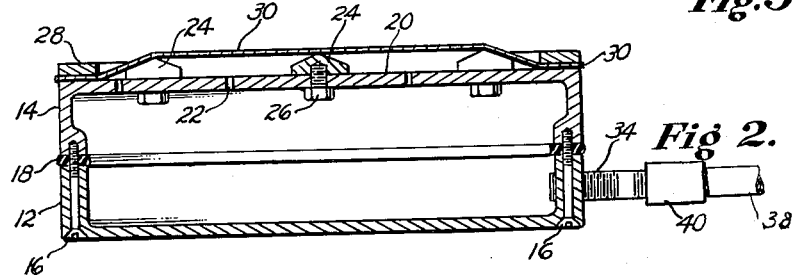
FIG. 2 is a transverse vertical sectional view of the apparatus shown in FIG. 1 taken on the line 2—2 on that view with the parts shown in assembled or operative relation.

Fixed on the topside 20 of the casing is a plurality of anvils 24 anchored in position by means of cap screws passing from the underside of the top section 14 through apertures therein and threaded into tapped recesses in the underside of the anvils as also shown in FIG. 2, where one of the cap screws is indicated at 26. An uneven, upwardly facing surface is thus presented by the topside of the casing 10, and this will be herein designated the test area of the apparatus. It will be understood that the anvils shown in the drawings are merely exemplary and that any other shape desired may be used, the shape varying with the stress it is desired to impose upon the sheet material about to be tested.

In conducting tests with the apparatus of the present invention, the material to be tested is disposed in overlying relation with the test area formed by the topside 20 and in fluid-tight sealing relation with the perimeter of the topside. A preferred form of material clamping means for so holding the material in the foregoing testing position is a square flat-sided frame 28 dimensioned to overlie the peripheral edges of the topside 20 and the portions of the sheet of material under test along these peripheral edges, as shown in FIG. 2 where the material is indicated at 30 on a greatly exaggerated scale insofar as thickness is concerned. The frame 28 may be forced downwardly with respect to the topside 20 by C-clamps 32 or any other suitable clamping means capable of applying sufficient force to form a fluid-tight seal between the material 30 disposed in testing position and the topside 20. When the clamps 32 have been tightened as aforesaid, the area of the topside 20 within the confines of the inner periphery of the frame 28 and overlaid by the sheet of material 30 is sealed from communication with atmospheric pressure but is in communication with the interior of casing 10 through perforations 22.

Figure 3:
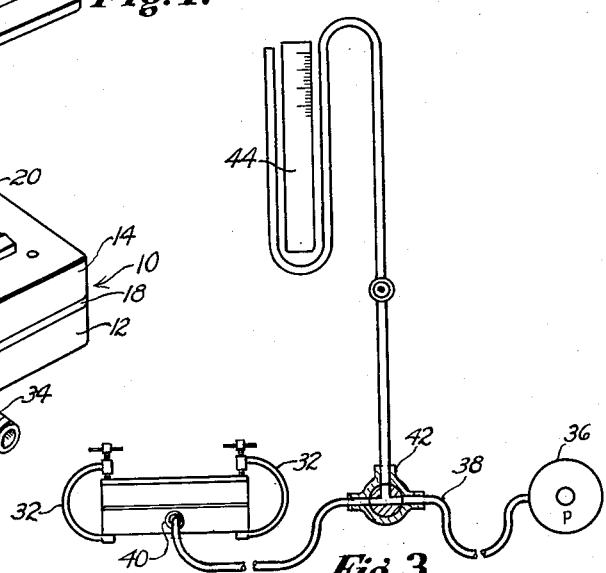
FIG. 3 is a more or less diagrammatic view of the various components used with the apparatus of the present invention connected in operative relation.

A suitable fitting 34 extending through one wall of the lower casing section 12 is provided for making connection to a source of vacuum which may be a pump shown diagrammatically at 36 in FIG. 3. This pump is connected to the fitting 34 by a system of pipes or conduits 38 coupled at one end to the fitting 34 by any suitable airtight coupling means 40 and at its other end to the pump 36. A three-way valve 42 is interposed in this conduit system to control the application of vacuum to the interior of the casing 10, and this valve also controls communication to a suitable indicating means to show the degree or value of the vacuum generated by the pump 36, such as the manometer indicated diagrammatically at 44 in FIG. 3.

Figure 4:
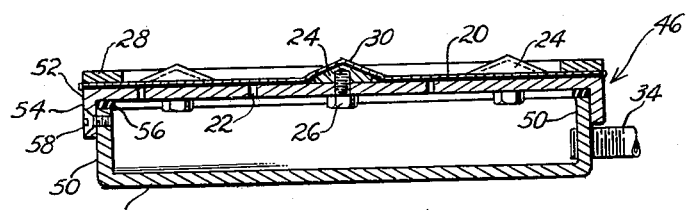
FIG. 4 is a transverse sectional view similar to FIG. 2 of a modification of the invention.

The modification of the invention shown in FIG. 4 which comprises a casing 46 consisting of a bottom section 48 having sidewalls 50 and a top section 52 having sidewalls 54 corresponds to the casing shown in FIG. 2 except for the fact that the sidewalls 54 of the top section 52 overlap the sidewalls 50 of the lower section 48 instead of seating thereon as in FIG. 2. In this form of the invention, a sealing gasket 56 is provided between the top edges of the sidewalls 50 of the lower section 48 and the underside of the top section 52, and the two sections are fixed together by a plurality of screws threaded into apertures in the sidewalls 50 and 54, one of these screws being shown at 58. In other respects, this form of the invention may correspond to that previously described, and the corresponding parts have been given the same numbers.

Briefly, to describe the operation of the improved testing apparatus, the sheet material 30 to be tested is placed on the casing 10 in overlying relation to the topside 20 and the anvils 24 projecting upwardly therefrom so that it rests on or partially or loosely drapes over the anvils. The clamping frame 28 is then placed in clamping position so as to overlie the sheet material 30 along the peripheral edges of the topside 20 as shown in FIG. 2, and the clamping means 32 may then be applied as shown in FIG. 3. Before tightening the clamps 32, any wrinkles or folds in the sheet material 30 in test position should be removed so that it is somewhat loosely draped over the anvils 24 as shown in FIG. 2. It will be obvious that upon reduction in the pressure in the casing 10, the air in the space between the topside 20 and the sheet material 30 will be forced out by the pressure differential between the interior and exterior of the casing 10 causing the sheet material 30 to conform to the contour of the test area 20 as shown in FIG. 4, and thus applying stress to the material 30 and particularly to those portions of the material overlying the anvils 24.

The improved testing apparatus of the present invention may be used for a number of purposes and for carrying out several kinds of tests on impermeable or semi-permeable sheet materials. For example, the apparatus may be used to make comparative tests on sheet materials which differ in composition, or which differ in grade or weight. In addition, the character of the stress to which these materials are subjected during testing may be varied by varying the shape of the anvils 24. The several tests to which sheet material may be subjected in the apparatus of the present invention include a determination of the maximum vacuum a material will withstand before bursting, the length of time a material will hold a predetermined pressure differential such, for example, as 15 inches of mercury and the amount of cold flow or "creep" occurring under stress over extended periods of time. In such tests, the degree or value of the vacuum can, of course, be controlled by controlling operation of the pump 36 or by means of valve 42, and it may be observed on the indicating means 44.

It is to be understood that the form of the invention herewith shown and described is to be taken as a preferred example of the same, and that various changes in the shape, size and arrangement of parts may be resorted to, without departing from the spirit of the invention or the scope of the subjoined claims.

I claim:

1. A device for testing the puncture and tear resistance of impermeable and semi-permeable barrier or wrapping materials in sheet form comprising a box-like casing of air-tight construction having one wall thereof perforated and provided with projecting portions to define an uneven outwardly facing surface, said latter surface forming a test area, means for releasably holding a sheet of material to be tested in testing position over said test area and in fluid-tight sealing relation thereto along the periphery of said area so as to leave the major portion of the outwardly facing side of said material exposed to atmospheric pressure and means for connecting the interior of said casing to a source of vacuum so that the sheet of material under test will be forced to conform to the uneven surface of the test area by the pressure differential between the interior and exterior of the casing thereby stressing said material.

2. A device for testing the puncture and tear resistance of impermeable and semi-permeable barrier or wrapping materials in sheet form comprising a box-like casing of air-tight construction having one wall thereof perforated and provided with projecting portions to define an uneven outwardly facing surface, said latter surface forming a test area, means for releasably holding a sheet of material to be tested in fluid-tight sealing relation with said test area along the peripheral edges thereof, means for connecting the inferior of said casing to a source of vacuum and a valve to control the vacuum applied to the interior of said casing.

3. A device for testing the puncture and tear resistance of impermeable and semi-permeable barrier or wrapping materials in sheet form comprising a box-like casing of air-tight construction having one wall thereof perforated and provided with projecting portions to define an uneven outwardly facing surface, said latter surface forming a test area, means for releasably holding a sheet of material to be tested in fluid-tight sealing relation with said test area along the peripheral edges thereof, means for connecting the interior of said casing to a source of vacuum and means to control the vacuum applied to the interior of said casing including indicating means to show the degree of vacuum therein.

4. A device for testing the puncture and tear resistance of impermeable and semi-permeable barrier or wrapping materials in sheet form comprising a box-like casing of air-tight construction having one wall thereof perforated, the outwardly facing side of said wall defining a test area, means for releasably holding a sheet of material to be tested in fluid-tight sealing relation with said test area along the peripheral edges thereof so as to leave the other portions thereof exposed to atmospheric pressure, means for connecting the interior of said casing to a source of vacuum, one or more anvils and cooperating means on said anvils and test area forming wall removably to secure said one or more anvils at various positions on the said test area.

5. A device for testing the puncture and tear resistance of impermeable and semi-permeable barrier or wrapping materials in sheet form comprising a box-like casing of air-tight construction throughout except for the presence of a series of perforations in one wall thereof, said perforated wall being provided with projecting portions on the outwardly facing side thereto to define an uneven outwardly facing surface over which a sheet of material to be tested may be disposed, a clamping frame adapted to overlie a sheet of the material in testing position throughout the perimeter of the uneven surface area, means for releasably clamping said frame against the said perimetrical areas sufficiently firmly to form a fluid-tight seal between the sheet material and the perimeter of the uneven area and means for reducing the pressure in said casing below atmospheric so that the sheet of material under test will be forced to conform to the uneven surface by the pressure differential between the interior and exterior of said casing thereby stressing said material.

6. A device for testing the puncture and tear resistance of impermeable and semi-permeable barrier or wrapping materials in sheet form comprising a box-like casing formed of complementary sections one of which has a perforated outwardly facing side of relatively large surface area provided with projecting portions to form an uneven test area, means for releasably connecting said sections together in fluid-tight relation, a clamping frame releasably to hold a sheet of the material to be tested in testing position over said test area and in fluid-tight sealing relation with the periphery of said test area and a connection to establish communication between the interior of said casing and a source of vacuum so that the sheet material overlying said test area will be forced to conform to the uneven surface thereof by the pressure differential when the connection is made thereby stressing said material.

7. A device for testing the puncture and tear resistance of impermeable and semi-permeable barrier or wrapping materials in sheet form comprising a generally rectilinear shaped two-part box-like casing including complementary sections one of which has a perforated reitilinear shaped outwardly facing site of relatively large surface area, one or more anvils, screw-threaded means for fixedly but removably mounting said one or more anvils on the outwardly facing side of said one section, said side forming a test area, means for releasably connecting the two sections together in fluid-tight sealing relation, a generally rectilinear shaped clamping frame to overlie a sheet of the material to be tested when the latter is in testing position on said test area, means for releasably clamping said frame and the perimeter of the said test area together sufficiently firmly to form a fluid-tight seal between the sheet of material interposed therebetween and the perimeter of the test area, and means for connecting the interior of said casing to a source of vacuum so that the material overlying the said test area will be forced to conform to said test area and the anvils thereon by the pressure differential thereby stressing said material.

No references cited.